United States Patent
Camenisch et al.

(10) Patent No.: US 10,027,477 B2
(45) Date of Patent: *Jul. 17, 2018

(54) DISTRIBUTED SINGLE SIGN-ON

(71) Applicant: International Business Machines Corporation, Armonk, NY (US)

(72) Inventors: Jan Camenisch, Thalwil (CH); Yossi Gilad, Tel-Mond (IL); Anja Lehmann, Zurich (CH); Zoltan A. Nagy, Zurich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,405

(22) Filed: Mar. 31, 2017

(65) Prior Publication Data
US 2017/0207912 A1 Jul. 20, 2017

Related U.S. Application Data

(63) Continuation of application No. 14/865,287, filed on Sep. 25, 2015, now Pat. No. 9,705,872.

(30) Foreign Application Priority Data

Sep. 25, 2014 (GB) .................. 1416888.4

(51) Int. Cl.
*H04L 9/08* (2006.01)
*H04L 9/30* (2006.01)
(Continued)

(52) U.S. Cl.
CPC .............. *H04L 9/085* (2013.01); *G06F 21/41* (2013.01); *H04L 9/30* (2013.01); *H04L 9/3213* (2013.01);
(Continued)

(58) Field of Classification Search
CPC ....... H04L 9/085; H04L 63/0815; H04L 9/30; H04L 9/3213; H04L 9/3236; H04L 9/3247; G06F 21/41
See application file for complete search history.

(56) References Cited

U.S. PATENT DOCUMENTS 6,240,512 B1  5/2001  Fang et al.
6,363,481 B1  3/2002  Hardjono
(Continued)

OTHER PUBLICATIONS

Bellare et al., "The Security of Practical Two-Party RSA Signature Schemes", IACR Cryptology ePrint Archive, 2001:60, 26 pages, 2001.

(Continued)

*Primary Examiner* — Matthew Smithers
(74) *Attorney, Agent, or Firm* — Stosch Sabo (57) ABSTRACT

Respective cryptographic shares of password data, dependent on a user password, are provided at n authentication servers. A number $t_1 \leq n$ of the password data shares determine if the user password matches a password attempt. Respective cryptographic shares of secret data, enabling determination of a username for each verifier server, are provided at n authentication servers. A number $t_2 \leq t_1$ of the shares reconstruct the secret data. For a password attempt, the user computer communicates with at least $t_1$ authentication servers to determine if the user password matches the password attempt and, if so, the user computer receives at least $t_2$ secret data shares from respective authentication servers. The user computer uses the secret data to generate, with $T \leq t_1$ of said $t_1$ servers, a cryptographic token for authenticating the user computer to a selected verifier server, secret from said at least T servers, under said username.

15 Claims, 8 Drawing Sheets (51) Int. Cl.
*H04L 29/06* (2006.01)
*G06F 21/41* (2013.01)
*H04L 9/32* (2006.01)

(52) U.S. Cl.
CPC .......... *H04L 9/3236* (2013.01); *H04L 9/3247* (2013.01); *H04L 63/0815* (2013.01)

(56) References Cited

U.S. PATENT DOCUMENTS

| | | | |
|---|---|---|---|
| 7,296,290 | B2 | 11/2007 | Barriga et al. |
| 7,690,026 | B2 | 3/2010 | Zhu et al. |
| 9,292,671 | B1 | 3/2016 | Robinson et al. |
| 9,705,872 | B2 * | 7/2017 | Camenisch ........... H04L 9/3213 |
| 2003/0221102 | A1 | 11/2003 | Jakobsson et al. |
| 2007/0044143 | A1 | 2/2007 | Zhu et al. |
| 2010/0131755 | A1 | 5/2010 | Zhu et al. |
| 2011/0119747 | A1 | 5/2011 | Lambiase |
| 2013/0276085 | A1 | 10/2013 | Sharaga et al. |
| 2016/0087792 | A1 | 3/2016 | Smith et al. |
| 2016/0094540 | A1 | 3/2016 | Camenisch et al. |
| 2016/0156611 | A1 | 6/2016 | Rozman |

OTHER PUBLICATIONS

Boneh et al., "Efficient Generation of Shared RSA keys", J. ACM 48(4):, 2001, 21 pages.
Brainard et al., "A New Two-Server Approach for Authentication with Short Secrets", USENIX, 2003, 13 pages.
Brasee et al., "A Novel Distributed Authentication Framework for Single Sign-On Services", SUTC, Jun. 11-13, 2008, 1 page.
Camenisch et al., "Practical Yet Universally Composable Two-Server Password-Authenticated Secret Sharing", Proceedings of the 2012 ACM Conference on Computer and Communications Security, pp. 525-536, ACM 2012, CCS'12, Oct. 16-18, 2012.
Camenisch et al., "Memento: How to Reconstruct your Secrets from a Single Password in a Hostile Environment", in Garay and Gennaro, editors, Advances in Cryptology—CRYPTO 2014 Proceedings, Part II, Lecture Notes in Computer Science, vol. 8617, Springer 2014, 28 pages.
Camenisch et al., "Concepts and Languages for Privacy-Preserving Attribute Based Authentication", Third IFIP wg 11.6 Working Conference, IDMAN 2013, 25 pages.
Feldman, "A Practical Scheme for Non-interactive Verifiable Secret Sharing", IEEE 1987, pp. 427-437.
Frankel et al., "Robust Efficient Distributed RSA-Key Generation", STOC '98 Proceedings of the 13th Annual ACM Symposium on Theory of Computing, pp. 662-672, 1998.
Gennaro et al., "Robust Threshold DSS Signatures", in EUROCRYPT '96 (LNCS 1070), 1996, 16 pages.
Gennaro et al., "Secure Distributed Key Generation for Discrete-Log Based Cryptosystems", J. Cryptology, 20(1):, pp. 51-83, 2007.
Josephson et al., "Peer-to-Peer Authentication with a Distributed Single Sign-On Service", IPTPS 2004, LNCS 3279, pp. 250-258.
MacKenzie et al., "Two-Party Generation of DSA Signatures", Int. J. Inf. Sec. 2(3-4), 2004, 18 pages.
Pedersen, "Non-Interactive and Information-Theoretic Secure Verifiable Secret Sharing", CRYPTO 1991, pp. 129-140, Springer-Verlag, 1998.
Shamir, "How to Share a Secret", Communications of the ACMM 22(11), pp. 612-613, 1979.
Shoup, "Practical Threshold Signatures", Eurocrypt 2000, vol. 1807 of Lecture Notes in Computer Science, pp. 209-222, Springer 2000.
Zhu et al., "ThresPassport-A Distributed Single Sign-On Service", International Conference on Intelligent Computing (ICIC 2005), Part II, vol. 3645 of Lecture Notes in Computer Science, pp. 771-780, Springer 2005.
Zhong et al. "A Novel Distributed Single Sign-On Scheme with Dynamically Changed Threshold Value", Fifth International Conference on Information Assurance and Security, IAS'09, vol. 2, Aug. 18-20, 2009, 2 pages.
Acar et al., "Single Password Authentication", Journal Computer Networks: The International Journal of Computer and Telecommunications Networking Archive, vol. 57, Issue 13, Sep. 13, 28 pages.
Di Raimondo et al., "Provably Secure Threshold Password-Authenticated Key Exchange", Eurocrypt, 2003, pp. 507-523.
MacKenzie et al., "Threshold Password-Authenticated Key Exchange", Crypto 2002, 41 pages.
Xu et al., "Two Efficient and Provably Secure Schemes for Server-Assisted Threshold Signatures", Topics in—Cryptology—CT-RSA 2003 Lecture Notes in Computer Science vol. 2612, 2003, pp. 355-373.
Nie et al., "SAML-based single sign-on for legacy system", Automation and Logistics (ICAL), 2012 IEEE Spectrum, Aug. 2012, 2 pages.
GB Search Report, from related application No. GB1416888.4, dated Mar. 24, 2015.
List of IBM Patents or Patent Applications Treated as Related, Mar. 29, 2017. 2 pages.
Camenisch et al., "Distributed Single Sign-On", GB Application No. 1416888.4, filed Sep. 25, 2014.

* cited by examiner

Authentication #1

Figure 5b

Authentication #1

Figure 5c

Authentication #1

Figure 5d

Authentication #1

Authentication #2

Figure 8a

Authentication #2

Figure 8b

DISTRIBUTED SINGLE SIGN-ON

This invention relates generally to distributed single sign-on systems. Methods are provided for generating cryptographic tokens for authenticating user computers in such systems, together with corresponding apparatus and computer programs and systems employing such methods.

Passwords are still the most commonly used method for online authentication of users when accessing service providers over networks. Ideally users should use different (and preferably cryptographically strong) passwords for all of their online accounts. In practice, users commonly resort to using the same password, or slight variations of the same password, with multiple service providers. Such user passwords are often cryptographically weak and easily guessed by a thief using an efficient offline brute-force attack. The risk here is clear: if one service provider is malicious or its system is compromised in an attack, then the adversary can gain access to all of the user's online accounts.

Single sign-on (SSO) systems aim to relieve users of the burden of remembering multiple passwords. Various SSO systems are known, one example being the Security Assertion Markup Language (SAML). In SSO systems, users can authenticate with any of a plurality of service providers by communicating with a trusted identity provider (IdP), typically using a master password which can be chosen to be relatively strong because it is the only password that the user must remember. In conventional SSO systems, the user communicates with a single authentication server operated by the IdP. The authentication server checks whether the user's newly-input password attempt matches his predetermined master password and, if so, generates a cryptographic authentication token in the form of a cryptographically signed statement which confirms authentication of the user. The authentication token is sent to the service provider where a verifier server confirms, via a cryptographic verification protocol, that the token correctly authenticates the user, whereupon the user computer is granted access to a restricted resource. Authentication tokens are usually valid only for a specific service provider, and for a short period of time, to reduce the impact of replay attacks.

An advantage of SSO systems such as SAML over the typical user-side password managers built into most web browsers today is that there is no need for synchronization of login information between a user's different computer devices (personal computers, smart phones, tablets, etc.). The user's password remains safe if the user computer is lost or stolen, and no long-term secrets which might be compromised by malware need to be stored on the user computer. However, implementing SSO schemes while maintaining security and user privacy is problematical. A major problem with the conventional SSO approach is that the IdP becomes a single point of failure in terms of security and privacy. If the authentication server is compromised, an attacker can impersonate any user at any service provider having a trust relationship with the IdP. The IdP in a SSO system also becomes a serious privacy bottleneck, able to track users' movements online by observing which users log into which websites at which points in time. Also, while the SAML system allows a user to be identified by different names to different service providers, in other SSO systems the service providers learn a globally unique identity of the user, making users' accounts linkable across all providers.

Distributed SSO systems have also been proposed in which password authentication is performed by a plurality of authentication servers. A distributed SSO system based on threshold signatures is described in U.S. Pat. No. 7,690,026 B2 and "Threspassport—a distributed single sign-on service", Bin Zhu et al., International Conference on Intelligent Computing (ICIC 2005), Part II, volume 3645 of Lecture Notes in Computer Science, pages 771-780, Springer 2005. In this system, a plurality of authentication servers hold respective shares of a private key issued by a service provider. The authentication servers can encrypt a service provider's challenge under their respective key-shares. The user combines the encryptions obtained from a threshold number t of the set of authentication servers to produce an authentication response for the service provider. Each authentication server here stores a hash of the username, password and authentication server name The hash from a malicious or compromised authentication server could therefore be used in an offline dictionary attack to recover the password and impersonate the user at all other authentication servers. Moreover, all authentication servers learn the identity of the service provider for each authentication request, allowing tracking of user activity. A variant of this system with an adjustable threshold t is described in "A Novel Distributed Single Sign-On Scheme with Dynamically Changed Threshold Value", Shangping Zhong et al., Fifth International Conference on Information Assurance and Security, IAS '09,Volume 2, 18-20 Aug. 2009.

"Peer-to-Peer Authentication with a Distributed Single Sign-On Service", Josephson et al., IPTPS 2004: 250-258, also describes a distributed SSO scheme using threshold signatures where the secret signing key is distributed over multiple authentication servers. Separate public keys are generated for each user and each server that the user visits. The process for authenticating users is unspecified, and the authentication servers learn the identity of the service provider in each user authentication process.

Another distributed SSO system using a threshold encryption scheme is described in "A Novel Distributed Authentication Framework for Single Sign-On Services", Kaleb Brasee et al., SUTC 2008: 52-58. Shares of a private key of the threshold encryption scheme are held by respective authentication servers. A two-factor user identity, based on a user password and information stored in a specialized USB (Universal Serial Bus) device, is required to authenticate with the authentication servers, each of which stores a password hash which might be used in an offline attack. At least t authentication servers sign a message, which includes a user ID and a service provider ID, to authenticate the user to the service provider, and the user is identified by the same user ID and is therefore linkable across all service providers.

Improved distributed SSO schemes would be highly desirable.

An embodiment of a first aspect of the present invention provides a method for generating a cryptographic token for authenticating a user computer, connectable via a network to a plurality of verifier servers and a plurality n of authentication servers, to a said verifier server under a username identifying the user computer to that verifier server. The method comprises:

providing at the n authentication servers respective cryptographic shares of password data, which is dependent on a predetermined user password, such that a plurality $t_1 \le n$ of the password data shares is needed to determine if said user password matches a password attempt;

providing at the n authentication servers respective cryptographic shares of secret data, which enables determination of said username for each verifier server, such that a plurality $t_2 \le t_1$ of the secret data shares is needed to reconstruct the secret data;

at the user computer, on input of a password attempt, communicating via said network with at least $t_1$ authentication servers to implement an authentication procedure in which said password data shares of those authentication servers are used to determine if said user password matches the password attempt and, if so, the user computer receives at least $t_2$ secret data shares from respective authentication servers; and at the user computer, on receipt of said secret data shares, reconstructing and using said secret data to generate, via communication with at least a plurality $T \leq t_1$ of said at least $t_1$ servers, a cryptographic token for authenticating the user computer to a selected verifier server, secret from said at least T servers, under said username for the selected verifier server.

Methods embodying this invention may offer distributed SSO schemes with enhanced security and user privacy. Password authentication is based on cryptographic shares of password data stored at respective authentication servers, requiring cooperation of $t_1 \leq n$ servers to validate a password attempt. Hence, individual authentication servers are not vulnerable to offline password-guessing attacks. Indeed, no collusion of less than $t_1$ authentication servers can expose password information. Moreover, the sharing by authentication servers of the secret data, which can be reconstructed by an authenticated user and which enables determination of a username used for sign-on at a verifier server, provides basis for distributed SSO operation without revealing the verifier server (and hence service provider ID) to the authentication servers. The user obtains a token for sign-on under his correct username for a selected verifier server while the verifier server is kept secret from the authentication servers. No collusion of less than $t_2$ authentication servers can track which service providers a user visits. In some embodiments to be described, authentication servers do not even learn the usernames used to identify users to verifier servers, and linking of information between different authentication requests and the resulting tokens can be further restricted. The enhanced privacy features of methods embodying the invention do not require long-term storage of secret data at the user computer, preserving protection against computer malware or theft and avoiding the need for synchronization between different user devices. Embodiments of the invention may thus offer significant improvements in SSO systems.

The nature of the password data shared by authentication servers, and the particular form of the various cryptographic shares held by these servers, can vary according to the cryptographic protocols employed for password validation and recovery of the secret data. This is discussed further below. The cryptographic shares may be provided at the authentication servers as a result of pre-storing in memory of the respective servers, or may be actively provided via steps performed in methods embodying the invention, e.g. during a setup procedure involving communications between the user computer and authentication servers following initial input of the user password. Such a setup procedure may comprise a plurality of setup protocols, performed separately by interaction of various parties to the system, as illustrated by examples below.

While the thresholds $t_1$, $t_2$ and T define minimum numbers of servers required for the respective operations, in general these operations might also be implemented by more servers than the required minimum The parameters n, $t_1$, $t_2$ and T can be selected as desired for a given system according to required security levels and the numbers of servers whose involvement is deemed acceptable at a given stage. Some embodiments may use $t_1 = n$, whereby all authentication servers in the system are required for password authentication. However, preferred embodiments employ a threshold scheme in which $t_1 < n$, with the advantage that only a subset of the authentication servers need to be available for authentication. While different values for thresholds $t_1$, $t_2$ and T can be set if desired, conveniently $t_2 = t_1$ and $T = t_1$.

In preferred embodiments, said username is different for every verifier server in the system. However, some or even all usernames could be the same in some embodiments while still offering user privacy from authentication servers. This will be explained in more detail below.

The secret data may enable determination of the username for a verifier server directly or indirectly. For example, the secret data may itself comprise data indicative of the username for each verifier server. As illustrated by examples below, such data may include the username itself, e.g. via a mapping of usernames to verifier server IDs, or may comprise data which indirectly indicates the username for a verifier, e.g. via a further mapping, defined at the authentication servers, between that data and the username. In other embodiments the secret data may comprise a cryptographic key for accessing stored data indicative of said username for each verifier server. Such stored data, which may again indicate usernames directly or indirectly, can be provided at a storage location accessible to the user computer via the network.

On successful authentication, the user computer can reconstruct the secret data and use this in generating, via communication with (at least) T authentication servers, a cryptographic token for authentication under the correct username for a verifier server. In this process, the (at least) T authentication servers may send to the user computer respective token components which the user computer can then combine to produce the cryptographic token. The token components can be dependent on a secret key of a cryptographic key pair, whereby the resulting token can be authenticated by the verifier server using a public key of this key pair to confirm that (at least) T servers authenticated the user's password attempt. A first preferred embodiment includes:

providing at the n authentication servers respective key-shares of a secret signing key (of a signing key pair) for a threshold signature scheme whose threshold equals T; and at the user computer, on reconstructing said secret data, using the secret data to obtain from each of said at least T servers a partial signature, under the key-share of that server, on said username for the selected verifier server, and producing the cryptographic token by combining the partial signatures. The verifier server can then authenticate the token using the public key of the signing key pair. Such embodiments are compatible with existing schemes such as SAML (where verification is performed using the public key of a signature scheme) whereby deployment can be transparent to service providers.

In a second preferred embodiment:

the method includes providing at each of the n authentication servers a secret issuance key of an issuance key pair for a privacy-preserving attribute-based credential scheme;

said secret data provides access to the username for each verifier server and the username comprises a pseudonym, which is bound to a secret user key, of said credential scheme; and the method further includes, at the user computer, on reconstructing said secret data, obtaining from each of said at least T servers a privacy-preserving credential, produced using said secret issuance key of that server and bound to said secret user key, and producing the cryptographic token using the credentials from those servers, wherein the cryptographic token comprises a presentation token of said credential scheme for proving knowledge of at least T said credentials each bound to the secret user key to which said pseudonym for the selected verifier server is also bound. The verifier server can then authenticate the token using the public key of the issuance key pair. Such embodiments offer SSO systems in which authentication servers do not learn even the username used with any service provider. Further advantages of these embodiments are explained below.

Preferred embodiments also permit use of user attributes in the SSO process. Attribute data, indicative of a set of one or more user attributes associated with the password holder, can be provided at each of the n authentication servers. The (at least) T authentication servers involved in the token generation procedure can then use this attribute data such that the final cryptographic token demonstrates any attributes required by the selected verifier. As discussed further below, such attribute data can be used in a variety of ways to enable demonstration of attributes to a verifier.

An embodiment of a second aspect of the invention provides a method for use at a user computer in generating a cryptographic token.

An embodiment of a third aspect of the invention provides a method for use at an authentication server in generating a cryptographic token for a user computer.

The invention also provides a computer program and a computer program product comprising program code means for causing a computer to perform a method according to any of the foregoing aspects of the invention. It will be understood that the term "computer" is used in the most general sense and includes any device, component or system having a data processing capability for implementing a computer program. Moreover, a computer program embodying the invention may constitute an independent program or program set or may be an element of a larger program or program set, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

Further aspects of the invention provide a user computer, an authentication computer and a distributed SSO system.

In general, where features are described herein with reference to an embodiment of one aspect of the invention, corresponding features may be provided in embodiments of another aspect of the invention as appropriate.

Preferred embodiments of the invention will now be described, by way of example, with reference to the accompanying drawings in which.

Figure 1:
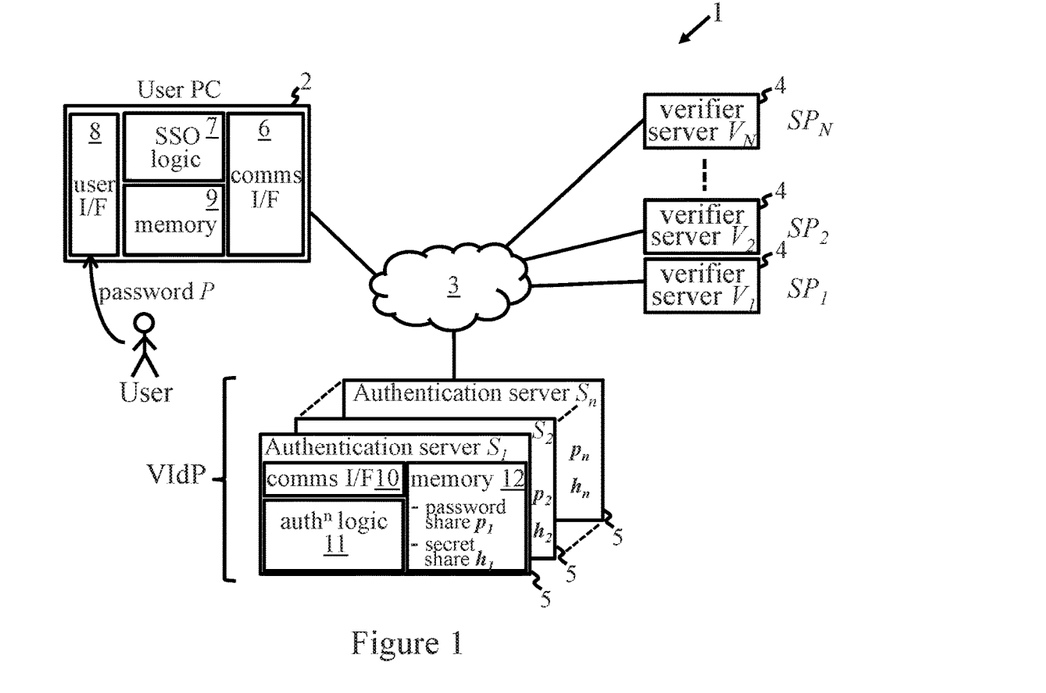
FIG. 1 is a schematic illustration of a data processing system for implementing distributed SSO methods embodying the invention.

FIG. 1 shows a simple example of a data processing system 1 for implementing a distributed single sign-on procedure whereby a user can connect to a plurality of service providers from a user computer 2 which is connectable to a network 3. The SSO system here comprises a plurality of verifier servers 4, denoted by $V_1$ to $V_N$ and operated by respective service providers $SP_1$ to $SP_N$, and a plurality n of authentication servers 5 denoted by $S_1$ to $S_n$. The n authentication servers 5 are operated by a trusted entity and collectively constitute a virtual identity provider (VIdP). All servers $V_1$ to $V_N$ and $S_1$ to $S_n$ are accessible to connecting users via network 3, where in general this network may comprise one or more component networks or internetworks, including the Internet. Each verifier server $V_1$ to $V_N$ operates in generally known manner to control access by a user computer 3 to some restricted resource in dependence on successful authentication via an SSO process to be described.

In the example shown, user computer 2 is implemented by a general purpose PC (personal computer), and each authentication server 5 is embodied as a general purpose computer implementing server functionality for user computers connecting over network 3. User PC 2 is shown simply here as comprising a communications interface 6 for communicating with servers 4, 5 over network 3, SSO logic 7 providing functionality for use in the SSO scheme to be described, a user interface 8 for data input/output interactions with the user, and memory 9. Memory 9 provides temporary storage for data as required during implementation of the SSO process. It is a particular feature of the preferred embodiments to be described that no long term secret data must be stored at user PC 2 for operation of the SSO scheme. Each authentication server 5 is shown comprising a communications interface 10, authentication logic 11 providing functionality for use in the SSO scheme, and memory 12 which stores data used by logic 11 in operation of the scheme. In particular, following a setup procedure described below, each authentication server $S_i$, i=1 to n, stores a respective cryptographic share $p_i$ of password data, and also a respective cryptographic share $s_i$ of secret user data. In general, the SSO logic 7 and authentication logic 11 may be implemented in hardware or software or a combination thereof. In this example, SSO logic 7 is conveniently implemented by software running on user computer 2 for causing the computer to perform the functions described. Similarly, authentication logic 11 is conveniently implemented by software for controlling authentication computer 5 to implement the functionality described.

The SSO schemes to be described enable the SSO logic of user PC 2 to generate cryptographic token for authenticating the user PC 2 to a selected verifier server 4 under a username which is used for identifying the user computer to that verifier server. (In effect, the username identifies the user computer as a device operated by a registered user of the associated SP's service). Generation of the cryptographic token depends on successful authentication of the user PC by the VidP authentication servers using a password input by the user at user PC 2. The cryptographic token thus serves to authenticate the user computer by confirming that the user entered a valid password. In the preferred embodiments below, the cryptographic token can also demonstrate that the user has certain attributes which may be required by the SP to qualify for access to its service.

The SSO systems to be described employ cryptographic techniques for distributed password authentication and for sharing of secret data over a plurality of servers. Such techniques are well established in cryptography and can be implemented using various known protocols. For instance, threshold password authenticated key exchange (TPAKE) protocols are well known in the art, illustrative examples being described in: "Threshold password-authenticated key exchange", MacKenzie et al., CRYPTO 2002; "A new two-server approach for authentication with short secrets", Brainard et al., USENIX 2003; and "Provably secure threshold password-authenticated key exchange", Raimondo et al., EUROCRYPT 2003. Briefly, TPAKE schemes provide protocols for distributing password data, which depends on a predetermined user password supplied by a user, across a plurality n of authentication servers. Each server stores a cryptographic share of the password data. These password data shares are cryptographically formulated such that a plurality $t_1 \leq n$ of the password data shares is needed to determine if the predetermined user password matches a subsequent password attempt input by a user. On input of the password attempt, a user can authenticate by communicating with (at least) a threshold number $t_1$ of the n authentication servers to implement an authentication procedure in which the password data shares of those $t_1$ servers are used to determine if the password attempt matches the predetermined user password. If so, respective shared secret keys $K_1$, $K_2$, ... $K_t$ are set up with the $t_1$ servers. Further communications between the user computer and those servers can then proceed over secure channels protected by encryption using the shared keys. TPAKE protocols are secure against man in the middle (MitM) attackers capable of eavesdropping and modifying communication. Such attackers cannot learn either the key or the password. Offline attacks on the password are frustrated because each server only stores a cryptographic share of the password data, and at least $t_1$ of the n servers must be compromised to expose the password to offline attack.

Secret sharing schemes are also well known in cryptography, illustrative examples being described in: "How to share a secret", Adi Shamir, CACM, 22(11):612-613, 1979; "A Practical Scheme for Non-interactive Verifiable Secret Sharing", Paul Feldman, FOCS 1987: 427-437; and "Non-Interactive and Information-Theoretic Secure Verifiable Secret Sharing", Torben P. Pedersen, CRYPTO 1991: 129-140. These schemes allow a user to share secret data across a plurality n of servers. Each server stores a respective cryptographic share of the secret data. The secret data shares are cryptographically formulated such that the secret data can be reconstructed from the secret data shares. The formulation can be such that (at least) a threshold number $t_2 \leq n$ of these shares is needed to reconstruct the secret data. TPAKE protocols may be used together with secret sharing schemes to construct a password authenticated secret sharing protocol (PASS) wherein the user saves cryptographic shares of his secret data on multiple servers, and can later retrieve secret shares to reconstruct the secret data on successful password authentication with the threshold number of servers. For security against MitM attacks, communication between the user and each server is performed over a secure channel established using the shared key obtained via the TPAKE protocol. Illustrative examples of such PASS protocols are described in: "Practical yet universally composable two-server password authenticated secret sharing", Camenisch et al., Proceedings of the 2012 ACM conference on Computer and communications security, pp 525-536, ACM, 2012, for a set of two servers both of which must authenticate the user before a key is established; and in "Memento: How to reconstruct your secrets from a single password in a hostile environment", Camenisch et al., in Garay and Gennaro, editors, Advances in Cryptology—CRYPTO 2014 Proceedings, Part II, Lecture Notes in Computer Science, volume 8617, pages 256-275, Springer, 2014, for a general t out of n threshold system.

The SSO schemes described below can exploit PASS protocols as summarized above for the distributed password authentication and sharing of secret data used in these schemes. While particular examples of such protocols are referenced above, in principle the schemes to be described can be implemented in various ways using known cryptographic techniques, e.g. using a combination of any compatible TPAKE and secret sharing protocols. Cryptographic implementations of the embodiments to be described can be readily constructed utilizing such known techniques, and suitable implementations will be apparent to those skilled in the art from the description herein.

Figure 2:
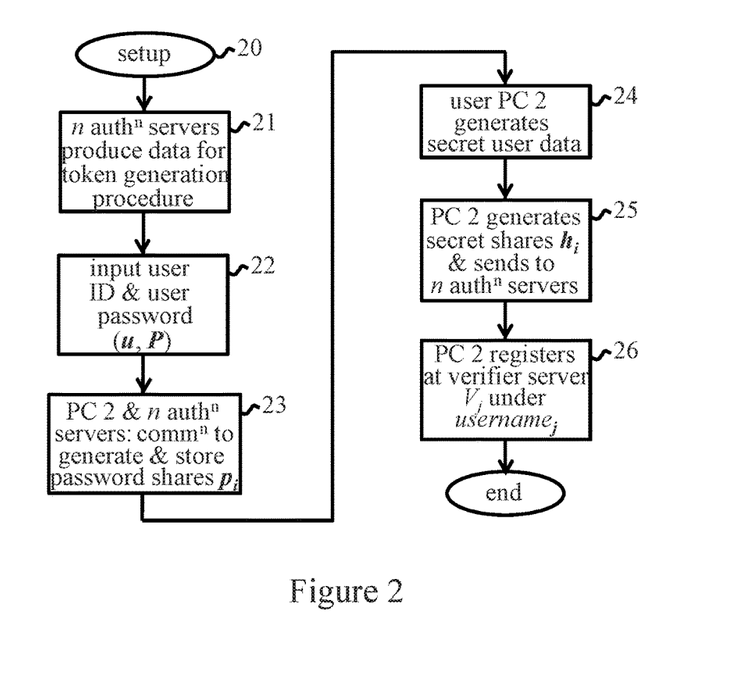
FIG. 2 indicates features of a setup procedure in operation of the SSO scheme.

An overview of the SSO procedure employed in system 1 will now be described with reference to the generalized flow charts of FIGS. 2 and 3. FIG. 2 indicates key features of a setup procedure. This procedure sets up a user for SSO login with multiple service providers $SP_j$, j=1 to N. On initiation of the setup operation as indicated at step 20, the authentication logic 11 of the n VidP authentication servers $S_i$ generate and store the cryptographic data required for generation of authentication tokens in the SSO scheme. This data depends on the particular cryptographic mechanism underlying construction and verification of tokens. Examples of such mechanisms are given below. To set up a user account at the VidP, at step 22 the user inputs a user ID (or master username) u and a user password P via user I/F 8 of user PC 2. Selection of a strong password P is feasible here as u and P are the only items that the user needs to remember. Next, at step 23, the SSO logic 7 of user PC 2 and the authentication logic 11 of the n VidP servers $S_i$ communicate via network 3 to generate the cryptographic shares $p_i$ of password data dependent on the user password P. This can be achieved by running the setup protocol of a TPAKE scheme as described above to register an account for user u with password P. To simplify the embodiments below, the threshold number $t_1$ of these password data shares (hereinafter termed "password shares") $p_i$ required to validate a subsequent password attempt is assumed to be the same as a threshold number T of servers $S_i$ required to generate a valid authentication token. This threshold is denoted hereinafter by t. (In other embodiments, the threshold number of password shares required for password authentication could be set by the user himself, and should be at least as high as the number T of servers required for token generation). The resulting password shares $p_i$ are stored in memory 12 of the respective authentication servers 5.

In step 24 of FIG. 2, the SSO logic of user PC 2 generates the secret user data to be shared among the VidP servers $S_i$. This secret data will enable determination, in a subsequent authentication procedure, of a respective username assigned by SSO logic 7 for identifying the user to a given verifier server $V_j$. The nature of this secret data, and how it enables username determination (alone or in conjunction with other data provided in the system), can vary as illustrated by the examples below. Next, at step 25, the SSO logic of user PC 2 generates the cryptographic shares $h_i$ of the secret data and supplies these to respective servers $S_i$ for storage in memory 12. To simplify the following examples, it is assumed that the number $t_2$ of the secret data shares needed to reconstruct the secret data is the same as the aforementioned threshold t. Finally, in step 25 the user registers at the verifier server $V_j$ of each SP under the username assigned for that verifier server. Setup is then complete.

While illustrated simplistically in FIG. 2, in practice the setup procedure may be implemented by a number of independent setup operations performed by communication of various parties to the system. Such operations can permit user registration with new verifier servers and updating of secret data accordingly. Also, various steps may be combined (e.g. steps 23 and 25) depending on protocol implementations, and processes may be performed in a different order to that illustrated. The form of the password data can vary for different protocols. The password data may, for example, comprise the password per se or other data from which the password can be determined or evaluated in a cryptographic operation. The nature of the password data shares will depend on the particular authentication protocol. Such a share might, for instance, comprise an encryption of the password plus a share of the decryption key, or some function derived from the password which can be combined with the other shares to define the password in a cryptographic operation. The secret data shares may similarly vary in nature according to operation of the secret-sharing protocol.

Figure 3:
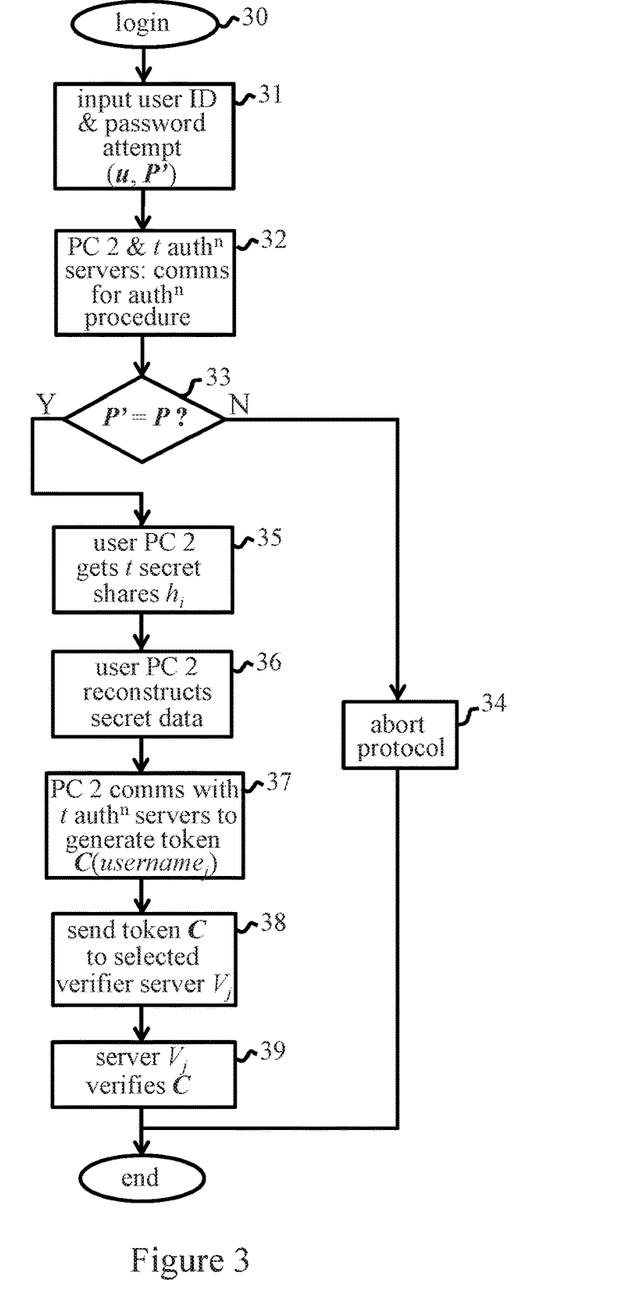
FIG. 3 indicates features of a login procedure in operation of the SSO scheme.

FIG. 3 indicates key features of a login procedure in which a user logs in to a selected service provider via its verifier server 4. On initiation of the login procedure as indicated at step 30, the user inputs his user ID u and a password attempt P' at user PC 2 in step 31. Next, in step 32, the SSO logic 7 of PC 2 sends an authentication request for u, P' via network 3 to t of the n VidP authentication servers 5. This initiates an authentication procedure in which, via communication of SSO logic 7 and logic 11 of the t authentication servers, the password data shares of the t servers are used to determine if the password attempt P' matches the user password P input during setup. If not, indicated by a "No" (N) at decision block 33, then the authentication procedure is aborted at step 34 and the process terminates. If the passwords match, indicated by "Yes" (Y) at block 33, then the SSO logic 7 of PC 2 receives the t secret data shares (hereinafter "secret shares") $h_i$ from respective authentication servers in step 35. SSO logic 11 reconstructs the secret data from the t secret shares in step 36. (Note that, in practice, the authentication procedure of step 32 to 36 may comprise distinct consecutive steps of password authentication and secret recovery, or these processes may be combined in the protocol. For example, the protocol may be such that the secret data can only be correctly recovered at the user PC if the password attempt is valid, meaningless random data being obtained if not). Next, in step 37, the SSO logic 7 of PC 2 sends a token request to each of the t authentication servers 5. This initiates a token generation procedure in which SSO logic 7 uses the recovered secret data to generate, via communication with the t servers, a cryptographic token for authenticating to the selected verifier server $V_j$ under the username assigned to that verifier server during setup. The details of this process depend on the cryptographic mechanism underlying the token scheme. In the examples below, however, each of the t servers generates a token component which is sent to user PC 2, and the t token components are combined by the SSO logic to produce the final token. In any case, through use of the secret data, the token C(username$_j$) is generated for the correct username without revealing to the t servers 5 the selected verifier server $V_j$ for which the token is required. In step 38, the SSO logic sends the token C(username$_j$) to the verifier server $V_j$. In step 39, the verifier server 4 can verify cryptographically that the token correctly authenticates the user, and the login is complete.

Embodiment #1

A first preferred embodiment of the SSO process will now be described with reference to FIGS. 4 and 5a to 5e. This embodiment is compatible with the SAML scheme mentioned earlier, as well as any other SSO scheme in which the IdP digitally signs an authentication token that is sent to an SP via the user. This backward compatibility of the first embodiment means that operation is transparent to SP verifier servers, requiring no change to the token verification infrastructure. The first SSO scheme employs threshold signatures as the cryptographic mechanism for generation and verification of the token C. Threshold signature schemes are well known in cryptography and need not be described in detail here. Briefly, a t out of n threshold signature scheme allows any subset of t out of n parties to form a signature. However, any subset of less than t players cannot create a valid signature. Each of the n parties holds a respective share $sk_i$ (i=1, n) of a secret (private) signing key sk of a public/private key pair (pk, sk). If each of t parties possessing a key-share uses that share to sign a message, then the resulting set of t partial signatures a, can be combined to produce a valid signature a on the message under the secret signing key sk. The resulting signature can be verified by any party using the public key pk to reveal the message. While numerous threshold signature schemes are known, for backwards compatibility with the SAML scheme the embodiment below can use a scheme in which the resulting signature a is verified using the RSA (Rivest Shamir Adleman) algorithm or the Digital Signature Algorithm (DSA or DSS) and a single RSA or DSS public key which represents the VIdP. Examples of such schemes are described in: "Practical threshold signatures", Victor Shoup, in Bart Preneel, editor, Advances in Cryptology—EUROCRYPT 2000, vol. 1807 of Lecture Notes in Computer Science, pages 207-220, Springer, 2000; "The security of practical two-party RSA signature schemes", Bellare and Sandhu, IACR Cryptology ePrint Archive, 2001:60, 2001; "Robust threshold DSS signatures", Gennaro et al., Inf. Comput., 164(1):54-84, 2001; and "Two-party generation of DSA signatures", MacKenzie and Reiter, Int. J. Inf. Sec., 2(3-4): 218-239, 2004.

Setup Procedure Embodiment #1

For step 21 of FIG. 2, the n authentication servers $S_i$ of the VIdP agree on a signing public/private key pair (pk, sk) of a threshold signature scheme with threshold t, where the i$^{th}$ server only knows its own share $sk_i$ of the secret signing key sk. The public key is distributed to verifier servers $V_j$. This may involve a common administrator of the VIdP who creates the key pair and the key-shares $sk_i$ and stores these shares at respective servers $S_i$. The administrator does not keep the secret key sk or its shares. Alternatively, the n servers $S_i$ could run together a distributed key generation protocol to set up the threshold signature keys. Examples of such protocols are described in "Secure distributed key generation for discrete-log based cryptosystems" Gennaro et al., J. Cryptology, 20(1):51-83, 2007 (for DSS) and, for RSA, "Efficient generation of shared rsa keys", Boneh and Franklin, J. ACM, 48(4):702-722, 2001, and "Robust efficient distributed rsa-key generation", Frankel et al., in Coan and Afek, editors, Principles of Distributed Computing, PODC '98, page 320, ACM, 1998.

On setting up the user account for (u, P) in step 23 of FIG. 2, each servers $S_i$ also associates attribute data with the user ID u. This attribute data is indicative of a set of user attributes $(a_1, a_2, \ldots a_l)$ associated with the password holder u. Attributes are widely used in cryptography and consist essentially of a set of values which indicate features associated with a user (e.g. date of birth, nationality, etc.) Attributes can be verified in various known ways which need not be discussed herein, the process being orthogonal to operation of the SSO scheme. The attribute data $u(a_1, a_2, \ldots a_l)$ is stored by each server $S_i$ along with its password data share $p_i$ for the user.

In step 24 of FIG. 2, the user PC generates secret data indicative of the username for each verifier server $V_j$. In this embodiment, the secret data comprises an alias table defining a mapping between the identify $V_{ID}$ of each verifier server $V_j$ and a verifier alias $a_j$ assigned by the SSO logic 7 to that server. The authentication servers $S_i$ in this embodiment each store a name table mapping the verifier alias $a_j$ to a respective username $\psi_j$ assigned to the server with alias $a_j$. The alias table, which constitutes the secret data in this case, thus indirectly indicates the username $\psi_j$ for a verifier server via the further mapping defined in the name table at the authentication servers. The procedures which implement steps 24 to 26 of FIG. 2 in this embodiment are as follows.

When initially setting up the user account for (u, P) at the VidP, the SSO logic 7 of PC 2 sends shares $h_i$ of an empty alias table to the authentication servers $S_i$. To register with an SP, SSO logic 7 creates a random alias $a_j$ for the verifier server $V_j$, and a fresh random username $\psi_j$ under which the user will be known at the SP. The user inputs his master credentials (u, P) at PC 2 whereupon SSO logic 7 initiates the TPAKE protocol to establish a shared key $K_i$ with each authentication server $S_i$. All further communication between the user and a server $S_i$ in this phase is carried over a secure channel created using the shared key $K_i$. The SSO logic then updates the alias table to include $V_j$, $a_j$, and updates the secret data at the VidP by sending shares $h_i$ of the updated alias table, together with the tuple $(a_j, \psi_j)$, to each server $S_i$. The servers $S_i$ can check that the pseudonym $\psi_j$ is not already in use by any other user for any SP. If so, the SSO logic can be asked for a new username and the protocol aborts. Assuming $\psi_j$ is unique, each server $S_i$ then updates the user's record with the updated alias table share $h_i$, and records the mapping $a_j$, $\psi_j$ in the name table in memory 12. The user then registers at the verifier server $V_j$ under the username $\psi_j$.

Figure 4:
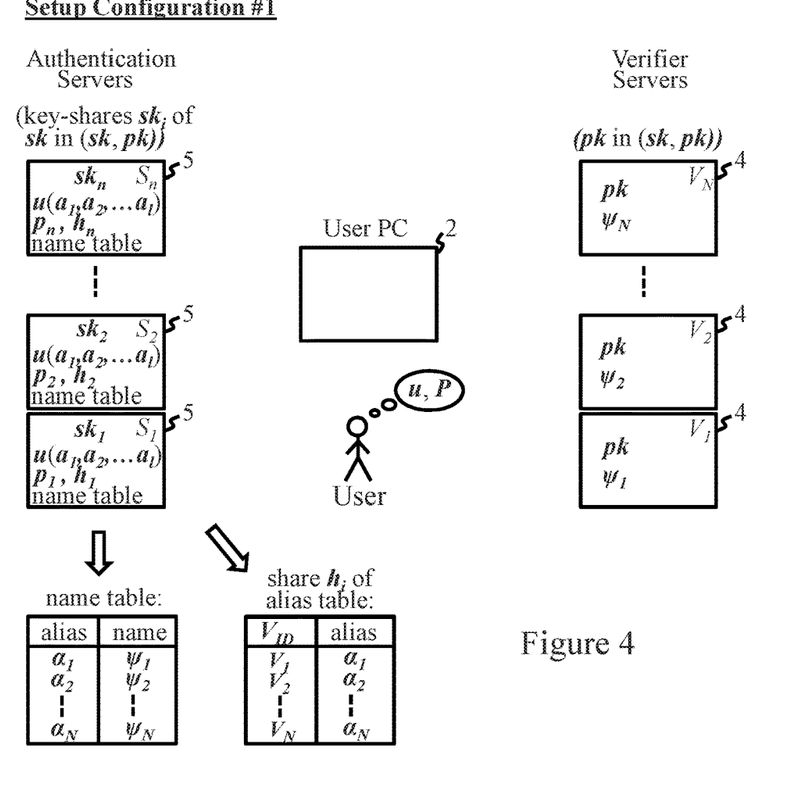
FIG. 4 indicates configuration of components of the FIG. 1 system following setup for a first SSO method embodying the invention.

The configuration of system 1, in terms of data stored at each of the system components, after registration at all service providers $SP_1$ to $SP_N$ is indicated in FIG. 4. Note that no secret data is stored at user PC 2.

Login Procedure Embodiment #1

FIGS. 5a to 5e indicate successive stages of a login procedure in this embodiment. The login begins in step (a) of FIG. 5a when the user sends a login request to the verifier server $V_j$ for a selected SP. The server $V_j$ responds in step (b) with an access token, indicating any user attributes atts required for login, and refers the user to the VidP for authentication. In step (c), the SSO logic 7 requests input of the user's ID u and a password attempt P'. In step (d), the user PC sends an authentication request to t of the n authentication servers $S_i$. This initiates a TPAKE protocol (step (e)) during which the password attempt P' is authenticated (step (f)) as described earlier. The TPAKE protocol establishes the shared keys $K_1$ to $K_t$ and a secure communication channel with each server $S_i$. All further communication with the servers $S_i$ proceeds over the secure channels.

Figure 5A:
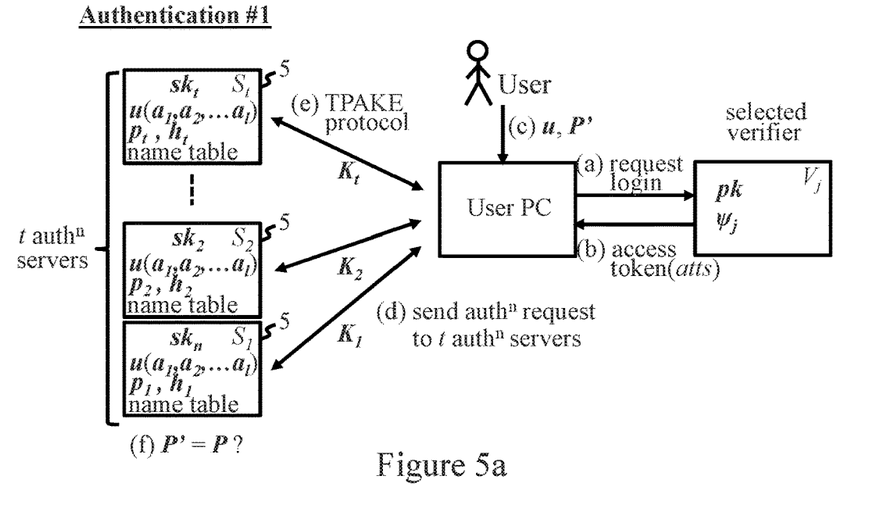
FIGS. 5a to 5e indicate steps of a login procedure with the first SSO method.
Figure 5B:
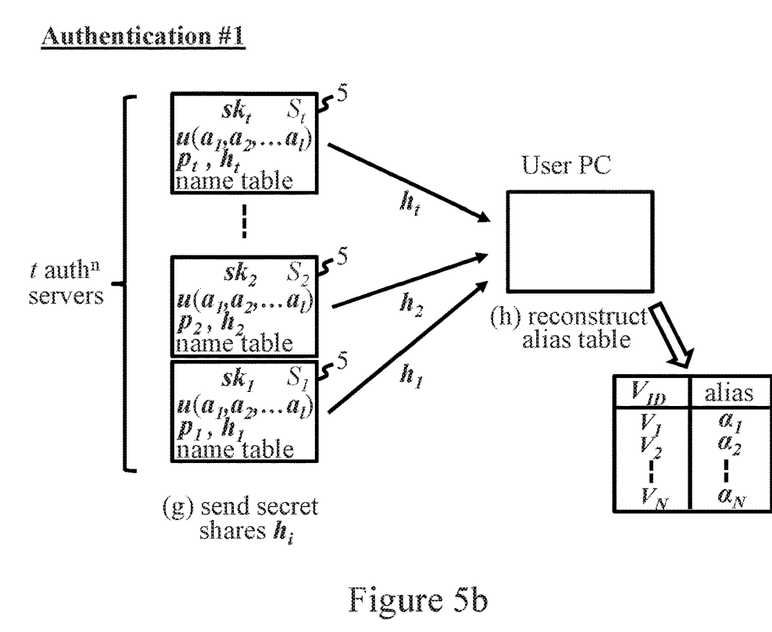
Figure 5C:
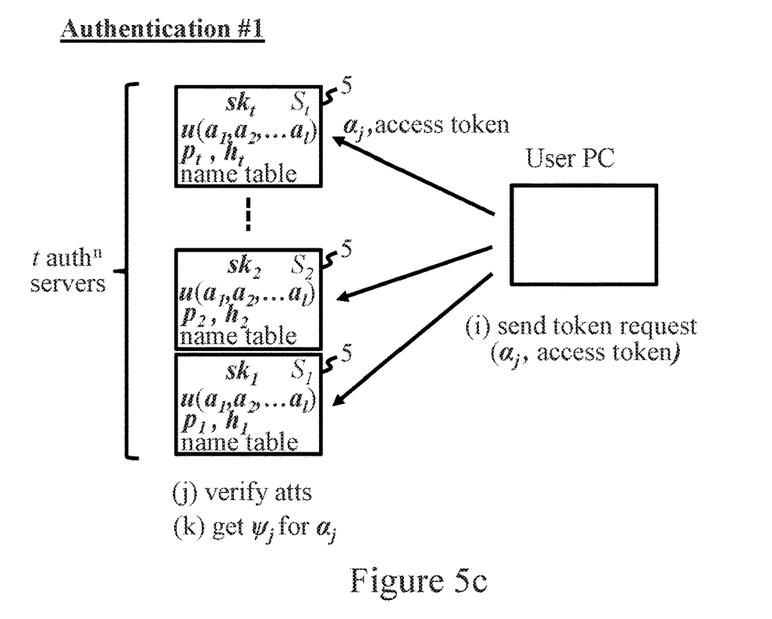
Figure 5D:
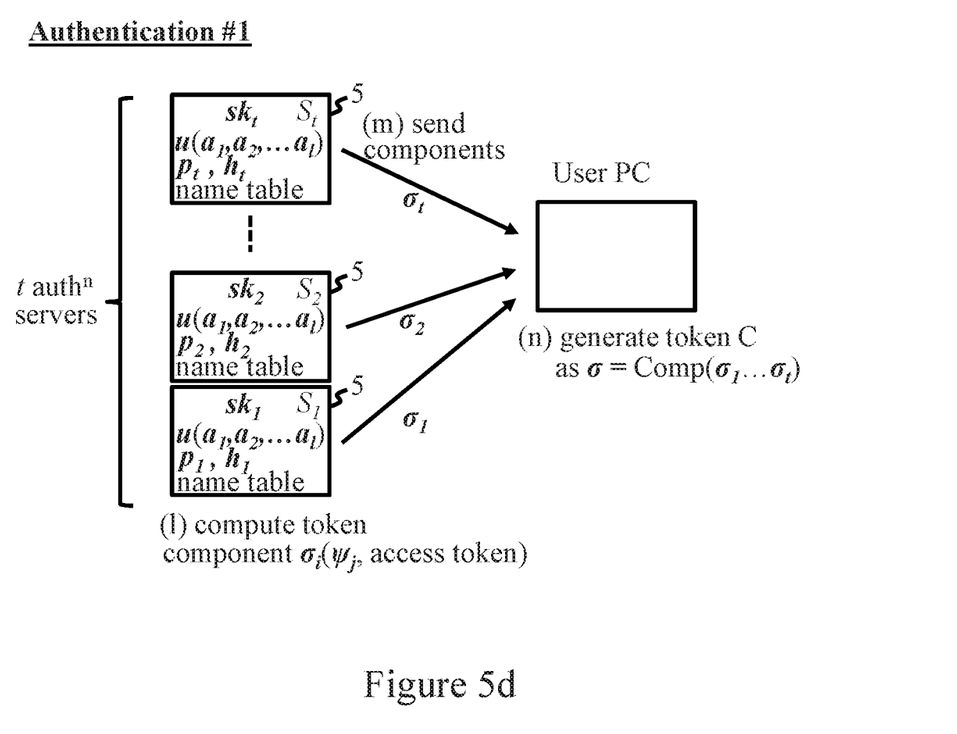

Next, in step (g) of FIG. 5(b), the t servers $S_i$ send their shares $h_i$ of the user's alias table on request by SSO logic 7. The SSO logic then reconstructs the alias table from these shares in step (h), and identifies the alias $a_j$ matching the identity $V_{ID}$ of the verifier server selected for login. (If no alias exists, the user can register a new alias as described above). In step (i) of FIG. 5c, the SSO logic then sends a token request to each of the t servers $S_i$. The token request comprises the access token received in step (b) and the alias $a_j$ for the selected verifier server $V_j$. In step (j), each server $S_i$ checks whether the user's attributes $(a_1, a_2, \ldots a_l)$ satisfy the attributes atts required by the access token. If not, the user will be advised and the login aborts. If all attribute requirements are met, then in step (k) each server $S_i$ identifies the username $\psi_j$ for the alias $a_j$ in the token request. In step (1) of FIG. 5d, each server $S_i$ computes a token component in the form of a partial signature $\sigma_i$, under its secret key-share $sk_i$, on a message comprising username $\psi_j$ and the access token in the token request. (The message can also include a time stamp and validity period or other convenient data for limiting temporal validity of the token. The resulting token is then short-lived, thus inhibiting use in a replay attack). In step (m), the servers $S_i$ then send their partial signatures $\sigma_i$ (encrypted under their respective keys $K_i$ for the secure channels) back to the user PC 2. In step (n), the SSO logic obtains a full signature a by combining the partial signatures $\sigma_i$ according to the algorithm, denoted here by "Comp", defined by the threshold signature scheme. (Depending on the signature scheme, this process may require use of the public key pk of the scheme). The resulting signature a constitutes the authentication token C.

Figure 5E:
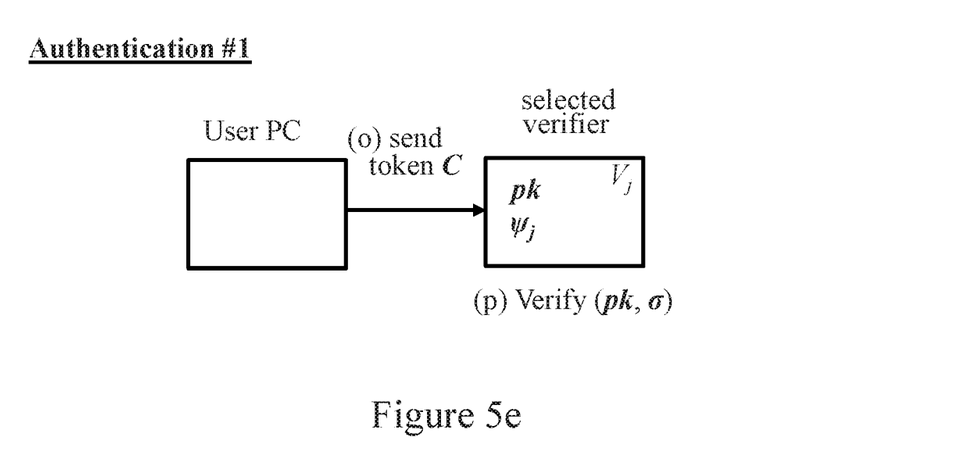

In step (o) of FIG. 5e, the user sends the token C to the selected verifier server $V_j$. The server $V_j$ can use the public key pk of the threshold signature scheme to verify that the token C constitutes a valid signature on its access token, thus authenticating the user under the correct username $\psi_j$ as specified in the token. Where the token defines a validity period the verifier can also check that the token has not expired. Assuming the token is valid, the login succeeds and the user gains access to the restricted resource.

It will be seen that the above process allows the user to authenticate under his correct username for any verifier server while keeping the identity of the verifier server secret from the authentication servers. No coalition of less than t authentication servers $S_i$ can observe which user is accessing which SP at which time. The system provides unlinkability across SPs: different usernames are used for all SPs so the authentication tokens used for different SPs cannot be linked to the same user by the SPs. This property holds even if all SPs collude and share their records. The user needs to remember only a single username and password. Authentication of the master password is done in a distributed fashion, however, so that no single server $S_i$, or group of servers $S_i$ less than the threshold t, can obtain any information which could be used in an offline dictionary attack on the password. Hence no coalition of less than t servers $S_i$ could impersonate the user, i.e. issue authentication tokens for the user for any SP. No secret data needs to be stored at the user computer, and there is no need for synchronization of different user devices. Other than the master password, there are no long-term secrets passing through the user's system that could be compromised by malware.

Figure 6:
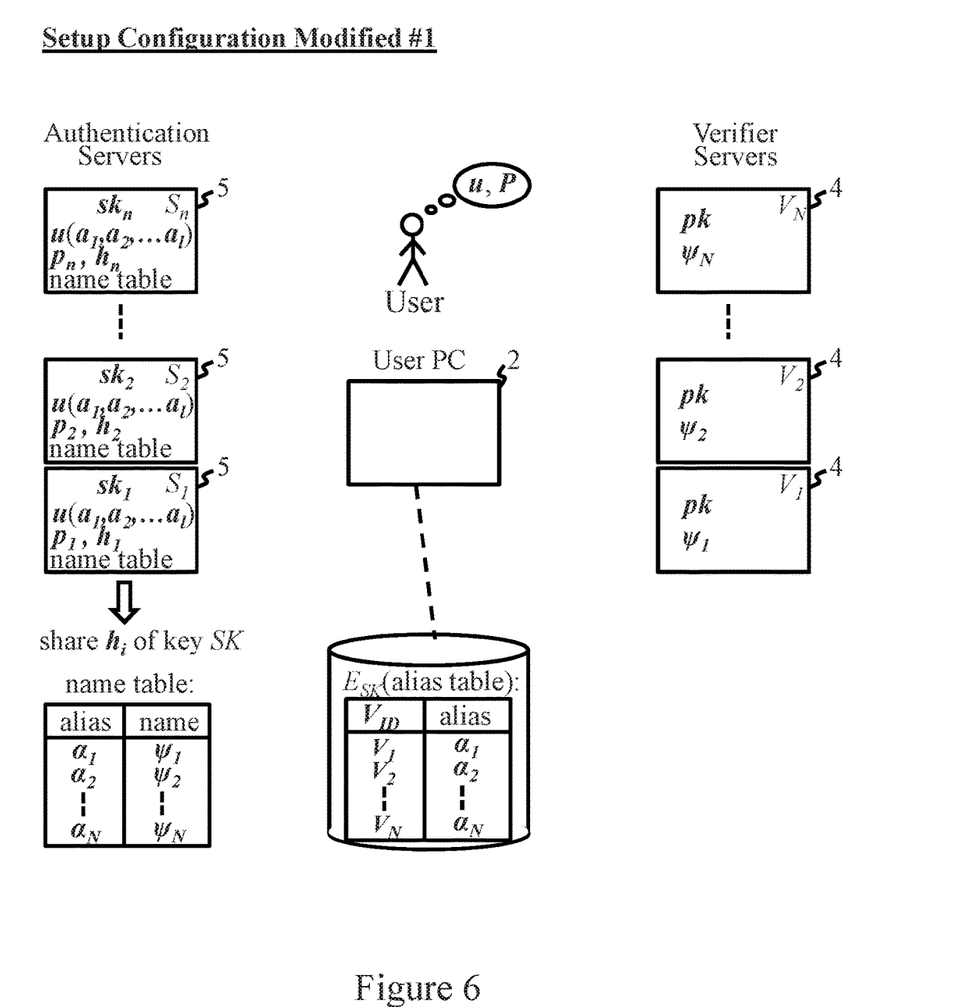
FIG. 6 indicates component configuration following setup in a modified implementation of the first SSO method.

A modification to the above embodiments avoids the need for all authentication servers $S_i$ to be available when the user updates his alias table and computes new secret shares for the servers. In the modified implementation, the secret data shared by authentication servers $S_i$ comprises a secret cryptographic key SK for accessing the user's alias table which is stored at a storage location accessible to the user PC via network 3. Such an external storage location ideally has high availability and may, for example, be a cloud-based file server system where the user stores his alias table encrypted using the key SK as $E_{SK}$. The key SK can be chosen by the user during setup. The authentication servers $S_i$ then receive shares $h_i$ of SK, which can be recovered on successful user authentication and used to access and decrypt the alias table. FIG. 6 indicates the configuration of system 1 after setup with this modified scheme. Since the key is static SK and does not change on updates, there is no need to access the authentication servers to change the alias table. Note that the storage service might also require username/password authentication, and the user could store shares of this username/password combination at the servers $S_i$ as part of his secret data.

Embodiment #2

A second preferred embodiment of the SSO process will now be described with reference to FIGS. 7 and 8a to 8c. In this embodiment, the cryptographic mechanism used for token generation and verification is based on privacy-preserving attribute-based credentials (Privacy-ABCs, or "PABCs" hereinafter). PABCs are well-established in cryptography. By way of example, the details of PABC schemes are explained in "Concepts and languages for privacy-preserving attribute-based authentication", Camenisch et al., Policies and Research in Identity Management—Third IFIP WG 11.6 Working Conference, IDMAN 2013, vol.396 of IFIP Advances in Information and Communication Technology, pages 34-52, Springer, 2013. To aid understanding of the embodiment below, a brief summary of relevant features of PABC schemes is given in the following.

PABCs. At a high level, a PABC system allows users to obtain credentials on lists of attributes certified by credential issuers. The users can then use these credentials to derive so-called presentation tokens that selectively reveal partial information about the credential attributes and can be verified by a verifying party using the credential issuer's public key. The presentation tokens have the privacy features that they do not expose any information about the credentials or credential attributes beyond what was explicitly revealed by the token, and they are untraceable in that an issuer cannot trace a presentation token back to the issuance of the credential from which it was derived.

User secrets and pseudonyms. A user can generate a strongly random user secret key usk and use it to authenticate to another party. However, unlike classical public-key authentication where each secret key has only one corresponding public key, here the user can generate as many public keys for usk as he wants. These public keys are known as "pseudonyms". A pseudonym may, for example, comprise a cryptographic commitment to (i.e. essentially a randomized blinding of) the secret key usk. When generating a fresh pseudonym nym, some metadata is also generated. The metadata μ relates to the randomness used in generating the pseudonym. A user can give nym to another party and later authenticate under nym using usk and μ.

Credentials and presentation tokens. A credential is a certified list of attribute values, and is issued to a user by a credential issuer. The user can derive a presentation token from one or more of his credentials using a "PABC:Present" algorithm, and thereby reveal a subset of the attributes in those credentials. Presentation tokens are unlinkable, meaning that a relying party cannot tell whether they were derived from the same or from different credentials, as well as untraceable as mentioned above.

Key binding. Credentials can optionally be bound to a particular user secret key usk, meaning that the user must know usk in order to derive a presentation token from the credential. This binding can be achieved by including usk as one of the attributes in a credential. A presentation token can contain multiple pseudonyms and credentials, and can optionally prove that all pseudonyms and credentials are bound to the same key usk.

Carry-over issuance. When a credential is issued using a "PABC:Issue" protocol, the user can optionally carry over his secret key usk from a pseudonym nym to the new credential, meaning that the new credential will be bound to usk, in such a way that usk remains hidden from the issuer. During issuance, the user proves knowledge of the key usk underlying nym.

Setup Procedure Embodiment #2

For step 21 of FIG. 2, each of the n authentication servers $S_i$ of the VIdP generates an issuance key pair (ipk$_i$, isk$_i$) for the PABC scheme. The "virtual" public key pk of the VIdP consists of the issuance public keys (ipk$_1$, ipk$_2$, ipk$_n$) of all servers $S_i$. This virtual public key pk is published and stored at all verifier servers $V_j$. Each server $S_i$ stores its own secret issuance key isk$_i$.

The procedures which implement steps 22 to 26 of FIG. 2 in this embodiment are as follows. The SSO logic of user PC2 generates a secret user key usk, and then derives a respective username, comprising a pseudonym nym$_j$=NDr (usk), for use with each verifier server $V_j$. Here "NDr(usk)" indicates that nym$_j$ is derived using the pseudonym derivation function of the PABC scheme so as to be bound to (i.e. include in blinded form) the secret user key usk. Each pseudonym nym$_j$ is associated with respective metadata μ$_j$. The SSO logic also derives a further pseudonym nym=NDr (usk), with associated metadata μ$_s$, which will be used in communications with authentication servers $S_i$. The resulting nym table mapping verifier server IDs $V_j$ to usernames nym$_j$, together with the secret user key usk and further pseudonym nym, is included in the secret user data of this embodiment.

Next, the SSO logic communicates with the n authentication servers $S_i$ to perform a setup procedure for a PASS protocol as described above, whereby the user sets up the user account for (u, P) and the password shares $p_i$ are stored at respective servers $S_i$. As before, each server $S_i$ also stores any user attributes ($a_1, a_2, \ldots a_l$) associated with the user u. Next, communicating over secure channels encrypted under the keys $K_1$ to $K_n$ generated during setup, the SSO logic sends each server $S_i$ the pseudonym nym and a share $h_i$ of secret user data: usk, nym, μ$_s$, and the nym table (nym$_j$, μ$_j$): $V_j$ for j=1 to N. Each server $S_i$ stores nym and its secret share $h_i$ for the user u.

Figure 7:
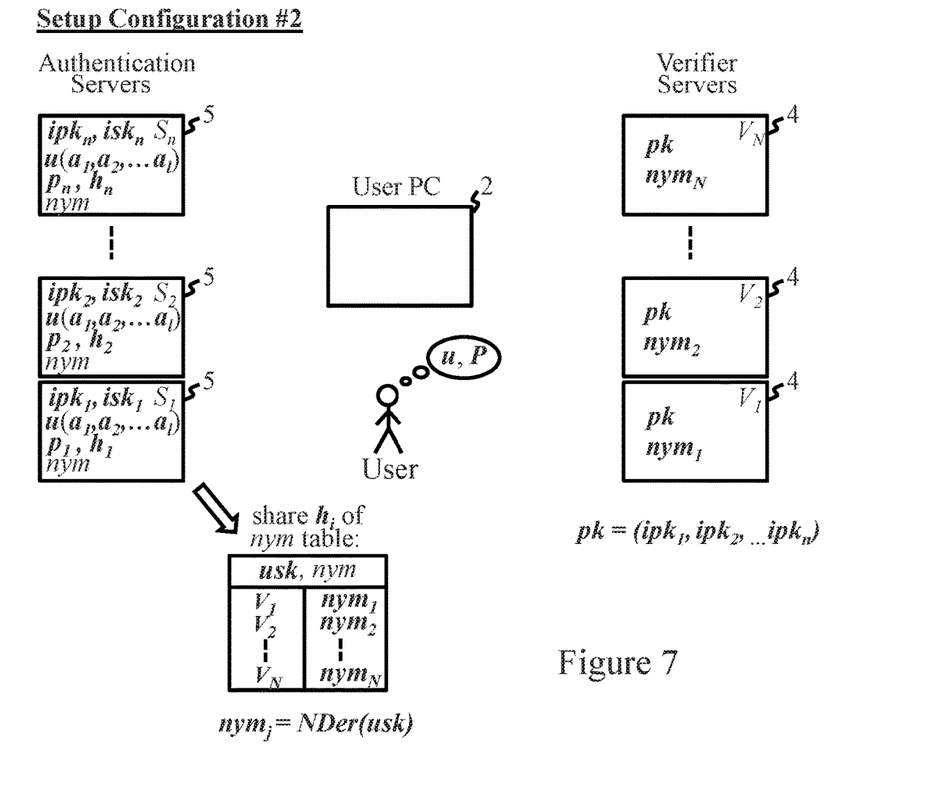
FIG. 7 indicates component configuration following setup for a second SSO method embodying the invention.

Finally, the user registers at each verifier server $V_j$ under the username nym$_j$. The threshold t for the SSO scheme can be defined at the verifier servers $V_j$ and may, for example be set by the user on registration. (While for simplicity here a single threshold t is assumed for the authentication, secret-sharing and token verification processes, in other embodiments thresholds may be selectable by the user). The configuration of system 1, in terms of data stored at each of the system components, after this setup procedure is indicated in FIG. 7. Again, no secret data is stored at user PC 2.

Login Procedure Embodiment #2

Figure 8A:
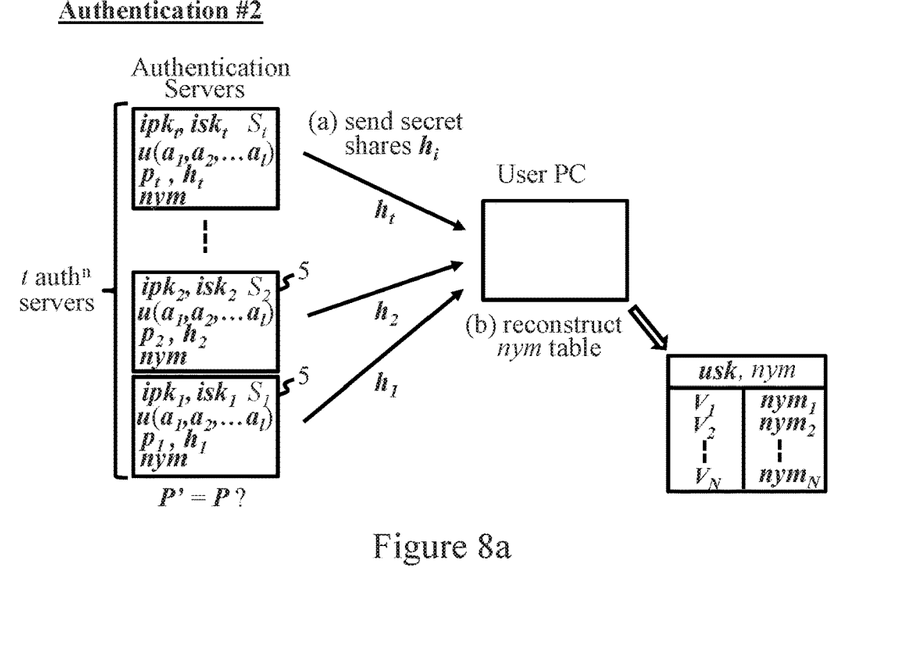
FIGS. 8a to 8c indicate steps of a login procedure with the second SSO method.

FIGS. 8a to 8c indicate successive stages of a login procedure in this embodiment. The initial stages of the login process correspond generally to FIGS. 5a and 5b above. Hence, the user sends a login request to the selected verifier server $V_j$ which responds with a request for authentication, indicating any user attributes atts required for login and referring the user to the VidP. The user authenticates with t of the n authentication servers $S_i$ and establishes the shared keys $K_1$ to $K_t$ with respective servers $S_i$. All further communication with the servers $S_i$ proceeds over secure channels protected by these shared keys. To complete the retrieve operation of the PASS protocol, the SSO logic obtains the secret shares $h_i$ of the t servers $S_i$ as indicated at step (a) in FIG. 8a. The SSO logic then reconstructs the secret data, including the nym table $(nym_j, \mu_j): V_j$, J=1 to N, as indicated at step (b).

Figure 8B:
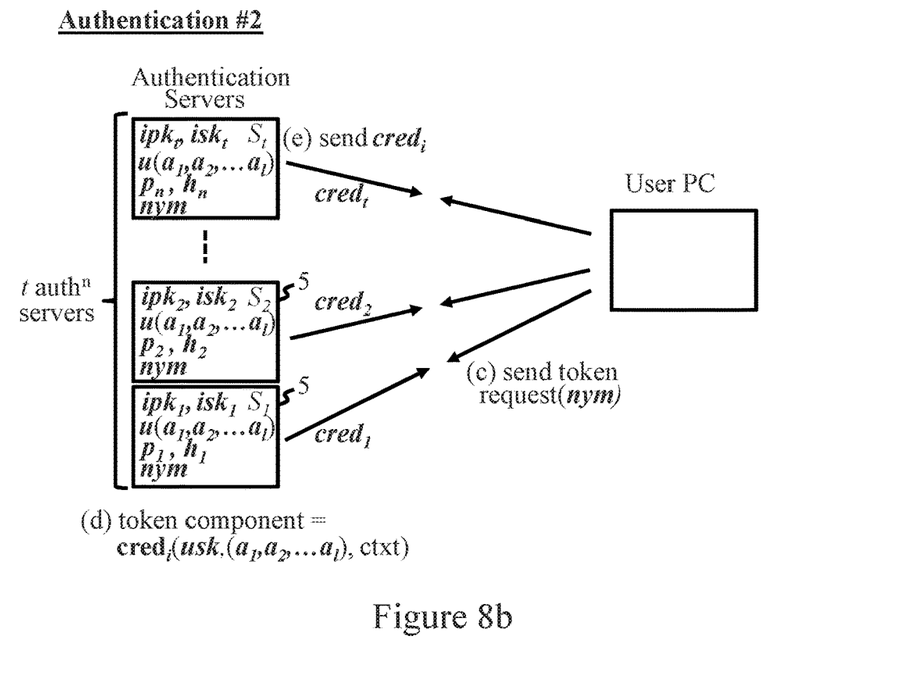

In step (c) of FIG. 8b, the user sends a token request, together with the pseudonym nym, to each of the t servers $S_i$. This initiates, with each server $S_i$, an issuance protocol of the PABC scheme wherein the SSO logic authenticates under the pseudonym nym and, through use of usk, nym and $\mu_s$, secures issuance at each server $S_i$ of a token component in the form of a PABC credential $cred_i$. The credential $cred_i$, is produced (step (d) of FIG. 8b) using the secret issuance key $isk_i$, of the server $S_i$, and is bound to the secret user key usk which is (blindly) carried over from the pseudonym nym. Each credential $cred_i$, also includes the user attributes $(a_1, a_2, \ldots a_1)$ associated with the user u, as well as context information ctxt which can include a time stamp, validity period and any other usage restrictions to restrict lifetime and use of the credential. The credentials $cred_i$ from the t authentication servers are sent to SSO logic 7 in step (e).

Figure 8C:
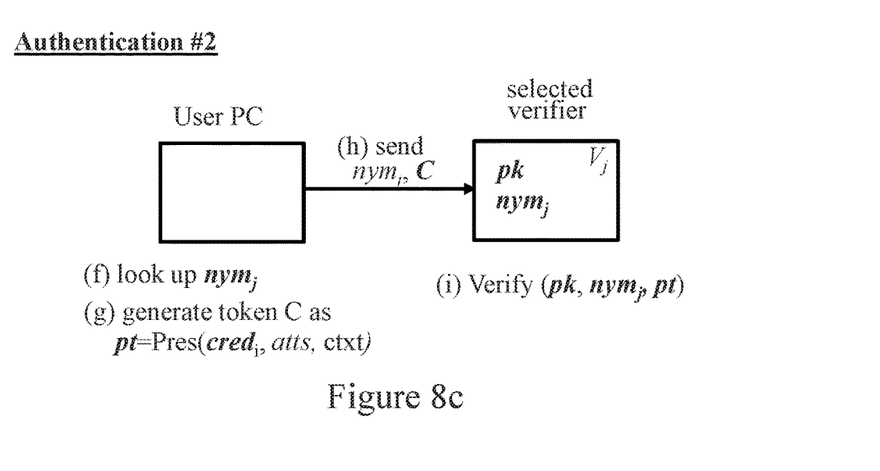

In step (f) of FIG. 8c, the SSO logic looks up the username $nym_j$ assigned to the selected verifier $V_j$ in the nym table recovered in step (b) above. Next, the SSO logic combines the t credentials $cred_i$ to produce an authentication token C. The token C here comprises a presentation token pt of the PABC credential scheme for proving knowledge of t credentials $cred_i$ each bound to the same key (usk) as the pseudonym $nym_j V_j$. The presentation token (denoted here by pt=Pres($cred_i$, atts, $nym_j$) where "Pres" represents a PABC:Present algorithm) thus presents $nym_j$ and all credentials $cred_i$, showing that all are bound to the same key (usk), and also reveals the attributes atts required for login at the $V_j$ as well as the context information ctxt.

The token C=pt is sent with $nym_j$ to the verifier server $V_j$ in step (h). The server $V_j$ verifies the presentation token using the virtual public key pk (containing the issuance public keys $ipk_i$ of servers $S_i$) and checks the context information ctxt. Assuming the token is valid, the login succeeds.

The second embodiment provides all the security and privacy benefits of the first embodiment above. In addition, the second embodiment offers enhanced privacy in that no collusion of less than the threshold number t of authentication servers can: (1) tell whether two authentication requests were for the same or different SPs; (2) see the users' pseudonyms $nym_j$ under which they log in at SPs; (3) link the authentication token received by an SP to the authentication session during which that token was created; or (4) see which attributes a user reveals to an SP. Note that feature (3) here also prevents a server $S_i$ from learning the frequency with which a user visits the same SP, preventing any possible inference, based on this frequency, as to the identity of the SP. This embodiment also gives the user greater flexibility in his choice of authentication servers $S_i$ because the servers do not have to organize themselves as a VIdP upfront. Rather, if the SPs trust the individual issuance public keys of all authentication servers in the system, then each user can select his own group of servers (and, if desired, the threshold that he trusts to manage his single sign-on system).

As with the first embodiment, in a modified version of the second embodiment the secret data shared by authentication servers $S_i$ may comprise a secret cryptographic key SK providing access to the user's nym table at another storage location in network 3.

Many other alternatives and modifications can be envisaged. For example, in a modification to the first embodiment, the secret data indicative of the usernames for verifiers could comprise a direct mapping of usernames to verifier IDs, and the user computer could supply the required username to the authentication servers when requesting a token. In the second embodiment, different values of the pseudonym nym could be employed for different servers $S_i$ if desired. In some embodiments, the same username $nym_j$ may be used for some or all verifier servers $V_j$. In this case the authentication servers still do not learn the username $nym_j$ that a user logs in under.

The embodiments described use the minimum, threshold number of servers required to implement the respective protocols. In general, however, these protocols can also be executed with more than the threshold number of servers.

While the above embodiments accommodate user attributes, use of attributes may be omitted. Also, while a simple data processing system 1 is described for illustrative purposes above, various other forms of data processing system can be envisaged. The user computer, for instance, may comprise another device such as a mobile phone, tablet computer, personal music player, etc. Embodiments might also be envisaged in which data generated in a setup procedure above is preloaded in the appropriate devices.

It will of course be appreciated that many other changes and modifications can be made to the exemplary embodiments described without departing from the scope of the invention.

Aspects of the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for generating, at a user computer which is connectable via a network to a plurality of verifier servers and a plurality n of authentication servers, a cryptographic token for authenticating the user computer to a said verifier server under a username identifying the user computer to that verifier server, wherein the n authentication servers store respective cryptographic shares of password data, which is dependent on a predetermined user password, such that a plurality $t_1 \leq n$ of the password data shares is needed to determine if said user password matches a password attempt, and further store the n authentication servers respective cryptographic shares of secret data, which enables determination of said username for each verifier server, such that a plurality $t_2 \leq t_1$ of the secret data shares is needed to reconstruct the secret data, the computer program product comprising a computer readable storage medium having program instructions embodied therewith, wherein the computer readable storage medium is not a transitory signal per se, the program instructions executable by a processor to cause the processor to perform a method comprising:

on input of a password attempt, communicating via said network with at least $t_1$ authentication servers to implement an authentication procedure in which said password data shares of those authentication servers are used to determine if said user password matches the password attempt and, if so, the user computer receives at least $t_2$ secret data shares from respective authentication servers; and on receipt of said secret data shares, reconstructing and using said secret data to generate, via communication with at least a plurality $T \leq t_1$ of said at least $t_1$ servers, a cryptographic token for authenticating the user computer to a selected verifier server, secret from said at least T servers, under said username for the selected verifier server.

2. A computer program product as claimed in claim 1 wherein $t_1 < n$.

3. A computer program product as claimed in claim 1 wherein $t_2 = t_1$.

4. A computer program product as claimed in claim 1 wherein $T = t_1$.

5. A computer program product as claimed in claim 1 wherein, to generate said cryptographic token:
   each of said at least T servers generates a token component, dependent on a secret key of a cryptographic key pair, and sends the token component to the user computer; and
   the user computer produces the cryptographic token by combining the token components, whereby the token can be authenticated by the selected verifier server using a public key of said cryptographic key pair.

6. A computer program product as claimed in claim 1 wherein said username is different for every verifier server.

7. A computer program product as claimed in claim 1 wherein said secret data comprises data indicative of said username for each verifier server.

8. A computer program product as claimed in claim 1 wherein said secret data comprises a cryptographic key for accessing stored data indicative of said username for each verifier server, said stored data being provided at a storage location accessible to the user computer via said network.

9. A computer program product as claimed in claim 1 including providing, at each of the n authentication servers, attribute data indicative of a set of user attributes associated with a holder of said user password, wherein, in generation of the token, said at least T authentication servers use the attribute data such that the cryptographic token demonstrates any attributes required by the selected verifier.

10. A computer program product as claimed in claim 1 including:
   providing at the n authentication servers respective key-shares of a secret signing key for a threshold signature scheme whose threshold equals T; and
   at the user computer, on reconstructing said secret data, using the secret data to obtain from each of said at least T servers a partial signature, under the key-share of that server, on said username for the selected verifier server, and producing the cryptographic token by combining the partial signatures.

11. A computer program product as claimed in claim 10 wherein said secret data provides access to a verifier alias for each verifier server, the method including:
   providing at the n authentication servers alias data mapping the verifier alias for each verifier server to said username for that verifier server;
   at the user computer, on reconstructing said secret data, sending to said at least T servers the verifier alias for the selected verifier server; and
   at each of said at least T servers, on receipt of the verifier alias, determining from said alias data the username mapping to that verifier alias, and producing said partial signature on the username so determined.

12. A computer program product as claimed in claim 1 wherein:
   the method includes providing at each of the n authentication servers a secret issuance key of an issuance key pair for a privacy-preserving attribute-based credential scheme;
   said secret data provides access to the username for each verifier server and the username comprises a pseudonym, which is bound to a secret user key, of said credential scheme; and
   the method further includes, at the user computer, on reconstructing said secret data, obtaining from each of said at least T servers a privacy-preserving credential, produced using said secret issuance key of that server and bound to said secret user key, and producing the cryptographic token using the credentials from those servers, wherein the cryptographic token comprises a presentation token of said credential scheme for proving knowledge of at least T said credentials each bound to the secret user key to which said pseudonym for the selected verifier server is also bound.

13. A computer program product as claimed in claim 12 including:
   providing at each of the n authentication servers a further pseudonym which is bound to said secret user key; and
   at each of said at least T authentication servers, when producing said privacy-preserving credential, binding the credential to the secret user key carried over from said further pseudonym.

14. A computer program product as claimed in claim 12 wherein said secret data further provides access to said secret user key.

15. A computer program product for use, at an authentication server being one of a plurality of n such authentication servers connectable to a user computer via a network, in generating a cryptographic token for authenticating the user computer to one of plurality of verifier servers under a username identifying the user computer to that verifier server, the computer program product comprising a computer readable storage medium having program instructions embodied therewith, wherein the computer readable storage medium is not a transitory signal per se, the program instructions executable by a processor to cause the processor to perform a method comprising:
   storing one of n cryptographic shares of password data, which is dependent on a predetermined user password, such that a plurality $t_2 \leq n$ of the n password data shares, each being stored by a respective one of the n authentication servers, is needed to determine if said user password matches a password attempt;
   storing one of n cryptographic shares of secret data, which enables determination of said username for each verifier server, such that a plurality $t_2 \leq_1$ of the n secret data shares, each being stored by a respective one of the n authentication servers, is needed to reconstruct the secret data;
   on receipt from the user computer of an authentication request sent to each of at least $t_1$ authentication servers on input of a password attempt at the user computer, communicating via said network to implement an authentication procedure in which said password data shares of those authentication servers are used to determine if said user password matches the password attempt and, if so, the user computer receives at least $t_2$ secret data shares from respective authentication servers;
   on receipt from the user computer of a token request sent to each of at least a plurality $T \leq t_1$ of said at least $t_1$ authentication servers on reconstruction of said secret data, communicating with the user computer to implement a token generation procedure in which, via communication with said at least T authentication servers, the user computer uses said secret data to generate a cryptographic token for authenticating the user computer to a selected verifier server, secret from said at least T servers, under said username for the selected verifier server.

* * * * *